United States Patent [19]

Mochizuki et al.

[11] Patent Number: 5,089,169
[45] Date of Patent: Feb. 18, 1992

[54] LIQUID CRYSTAL MATERIAL AND DISPLAY DEVICE USING SAME

[75] Inventors: Akihiro Mochizuki, Atsugi; Masayuki Iwasaki, Zama, both of Japan

[73] Assignee: Fujitsu Limited, Kawasaki, Japan

[21] Appl. No.: 466,663

[22] Filed: Jan. 17, 1990

[30] Foreign Application Priority Data

Jan. 17, 1989 [JP] Japan ................... 1-008119

[51] Int. Cl.$^5$ ................... C09K 19/12; C09K 19; C09K 20; C07C 69/76
[52] U.S. Cl. ................... 252/299.65; 252/299.66; 252/299.64; 560/73; 560/102
[58] Field of Search ................... 252/299.01, 299.65, 252/299.66, 299.64; 560/73, 102

[56] References Cited

U.S. PATENT DOCUMENTS 4,764,619 8/1988 Gunjima et al. ............ 252/299.65

FOREIGN PATENT DOCUMENTS 1-75450 3/1989 Japan .
2216371 10/1989 United Kingdom ........... 252/299.65

OTHER PUBLICATIONS

M. Koden et al., "Novel Optically Active Compounds for Ferroelectric Liquid Crystals", Molecular Crystals and Liquid Crystals: Section Letters, vol. 6, No. 6, 1989, pp. 197-202.

*Primary Examiner*—John S. Maples
*Assistant Examiner*—Philip Tucker
*Attorney, Agent, or Firm*—Staas & Halsey

[57] ABSTRACT

Super twisted nematic liquid crystal materials containing at least one double chiral nematic liquid crystal compound of the following general formula:

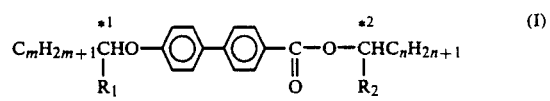

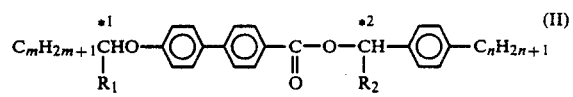

or

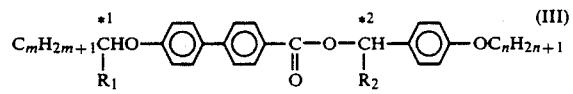

in which
$R_1$ and $R_2$ may be the same or different and each represents a methyl group or an ethoxy group,
m is an integer of 2 to 12,
n is an integer of 2 to 12, and
the symbols $*^1$ and $*^2$ each denote a chiral center of an (S)- or (R)-modification of the compound, and liquid crystal display devices using such liquid crystal materials. The display devices can provide a high information content of $640 \times 400$ dots or more without cross-talk among the images.

11 Claims, 4 Drawing Sheets

LIQUID CRYSTAL MATERIAL AND DISPLAY DEVICE USING SAME

BACKGROUND OF THE INVENTION

1. Field of the Invention

The present invention relates to a liquid crystal material, more particularly, to a super twisted nematic mode liquid crystal material by which a largescale display of 640×400 dots or more can be formed at a high duty ratio without inducing image crosstalk. The present invention also relates to a super twisted nematic mode liquid crystal display device using the liquid crystal material of the present invention.

2. Description of the Related Art

As is well-known, a variety of liquid crystal display devices are widely used as a display means in different fields of technology, due to their many advantages such as a high information content, low drive voltage, extreme durability, and a flicker-free display. Based on these advantages, the liquid crystal display devices are particularly used in terminals of information processors, especially office automation or "OA" devices, for example, personal computers or word processors, and when used in such OA devices, the display devices are generally driven by a simple matrix drive system using X- and Y-stripe electrodes, i.e., so-called "direct driving method".

A typical example of such prior art liquid crystal display devices is a twisted nematic or "TN" mode liquid crystal display device. The TN mode liquid crystal display device is characterized by a twisting angle of 90° and is particularly useful in a black and white display because of an absence of any spectrum dispersion. Nevertheless, this type of the display device does not provide a satisfactory display of images on a large scale, as it has a duty ratio of at most about 1/64. If the duty ratio is increased to more than 1/64, the contrast of the images is deteriorated with the decrease of the duty ratio, and at the same time, crosstalk among the displayed images occurs. It is considered that the crosstalk is caused by the simple matrix structure of the device; i.e., the crosstalk is induced in this simple matrix structure device due to interference between each picture element.

More particularly, FIG. 1 shows a characteristic curve (applied voltage vs. transmittance at 1/64 duty ratio) of the prior art TN mode liquid crystal material. As shown in the FIGURE, a transmittance (%) can be varied depending upon the applied voltage (V), and a satisfactory difference of the transmittance at two different voltages can be obtained $V_{on}$ for selected voltage and $V_{off}$ for non-selected voltage. However, the curve also shows that, if the duty ratio is decreased to 1/200 or less to provide a large scale display, the difference of the transmittance is reduced, and thus crosstalk occurs, as the $V_{off}$ is close to the $V_{on}$, because of a gentle inclination of the curve, and accordingly, a poor threshold characteristic is shown.

Recently, it has been found that the above problems of higher duty and crosstalk can be solved if the liquid crystal material and the orientation layer are improved. Surprisingly, a super twisted nematic or "STN" mode liquid crystal material, characterized by a twisting angle of more than 90° and less than 270°, enables a large size liquid crystal panel of 640×400 dots to be driven at a duty ratio of 1/200 to 1/400, without image crosstalk. This is because the STN mode liquid crystal material has a good and steep threshold characteristic. Note, the STN mode liquid crystal material generally comprises a mixed nematic liquid crystal and a cholesteric phase liquid crystal added to the mixed liquid crystal to give a helical structure thereto.

It has been also found that, although the STN mode liquid crystal material is generally considered to be satisfactory, notable crosstalk sometimes occurs therein depending upon specific images or patterns to be displayed, and this crosstalk is increased with an increase of the information content.

The inventors carried out an intensive study of the reasons why the crosstalk occurs in the prior art STN mode liquid crystal material, and found that the crosstalk is increased with an increase of the number of pulses needed for writing images or patterns in the liquid crystal material. Namely, a brightness in a background area of the display is not the same in areas of complicated patterns (increased number of writing pulses) and in areas of no substantial pattern (the least writing pulses).

From the above study, the inventors also found that the crosstalk occurs in the STN material because an effective voltage applied to the liquid crystal material can be changed depending upon the length of the writing pulses, i.e., frequency of the writing pulses, and the characteristic curve of the applied voltage vs. transmittance is accordingly shifted to the left (lower voltage) or right (higher voltage). The mechanism of the crosstalk is diagrammatically shown in FIG. 2, in which the frequency of the writing pulses is 50 Hz, 1 kHz and 10 kHz. When the effective voltage applied to the liquid crystal material was changed as a result of an increase of the frequency, the characteristic curve was shifted as shown in FIG. 2. The details of this mechanism will be discussed hereinafter with reference to FIG. 3 and 4, for a further understanding of the present invention.

Therefore, there is an urgent need to provide an improved STN mode liquid crystal material not having the prior art problems described above, such as crosstalk, and capable of displaying images or patterns in a large display area. Note, crosstalk must be completely prevented regardless of the pulses used when writing.

SUMMARY OF THE INVENTION

An object of the present invention is to provide a novel liquid crystal material for use in a high information content STN mode display in which prior art problem of crosstalk does not arise.

Another object of the present invention is to provide a novel display device of an STN mode display system using the STN mode liquid crystal material of the present invention.

The inventors found that these objects can be accomplished by modifying a composition of the prior art STN mode liquid crystal material; namely, by incorporating at least one specific double chiral nematic liquid crystal compound, as a cholesteric phase liquid crystal for giving a spiral structure to the resulting liquid crystal material, to a mixture of nematic liquid crystals.

In one aspect of the present invention, there is provided a liquid crystal material for use in an STN mode display, which material contains at least one double chiral nematic liquid crystal compound of the following general formula:

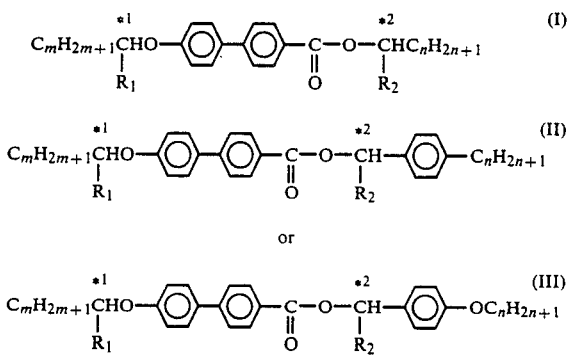

in which
R₁ and R₂ may be the same or different and each represents a methyl group or an ethoxy group,
m is an integer of 2 to 12,
n is an integer of 2 to 12, and
the symbols *¹ and *² each denote a chiral center of an (S)- or (R)-modification of the compound.

In another aspect of the present invention, there is provided a liquid crystal display device of an STN mode display system, which comprises a layer of liquid crystal material containing at least one double chiral nematic liquid crystal compound of the above-described general formula (I), (II) or (III), and a means for applying a voltage across the liquid crystal material layer to form a liquid crystal image therein.

The liquid crystal material and liquid crystal display device according to the present invention will be described hereinafter in detail, but before this, the mechanism of the crosstalk described above with reference to FIG. 2 will be further described with reference to FIGS. 3 and 4, in which FIG. 3 represents an example of the prior art STN mode liquid crystal material and cholesteryl nanoate of the general formula:

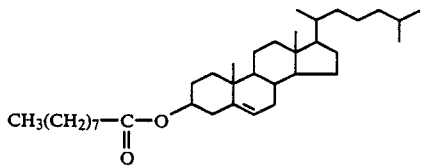

, conventional liquid crystal compound, was used as a cholesteric phase liquid crystal, and FIG. 4 represents an example of the STN mode liquid crystal material of the present invention and a double chiral nematic liquid crystal compound of the general formula:

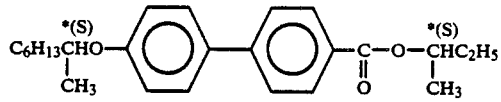

was used as a cholesteric phase liquid crystal.

If a polarity of the pulse of the applied voltage is reversed, for example, from +10 V to −10 V as shown in a lower graph of FIG. 4(A), only a charging and discharging electric current 1 flows into the electrodes at a cross point of the X- and Y-electrodes, as also shown in FIG. 4(A), upper graph. Nevertheless, an application of the charging and discharging electric current 1 of FIG. 4(A) is not ensured in the prior art STN material, and thus as shown in an upper graph of FIG. 3(A), a polarity reverse electric current 2 is induced to the electrodes, in addition to the application of the charging and discharging electric current 1. The inventors found that a characteristic curve of the applied voltage vs. transmittance is largely shifted with an increase of the polarity reverse electric current 2. This teaches that a shift of the characteristic curve can be avoided if a total amount $S_1$ of the reverse charge is reduced to a negligible level by removing a peak electric current $I_p$ of the polarity reverse electric current 2 and the charging electric current 1, as shown in FIG. 3(A). Further, the inventors found that both the peak electric current $I_p$ and total reverse charge $S_1$ can be largely varied depending on a specific cholesteric phase liquid crystal added to the mixed nematic liquid crystal to induce a spiral structure therein, and based on these findings, the inventors completed the present invention.

In connection with the above, the inventors also found that the polarity reverse electric current 2 of FIG. 3(A) originates from the formation of an adsorption layer or electric double layer as shown in FIG. 3(B). It is considered that the adsorption layer was formed as a result of the selective concentration of liquid crystals having a high polarity, such as cyanobiphenyl, and accordingly, a poor compatibility in the liquid crystal layer. As shown in FIG. 4(B), the liquid crystal layer of the present invention has no adsorption layer, and therefore as shown in FIG. 4(C), no shifting occurs. Note, FIG. 3(C) corresponds to FIG. 4(C), but additionally shows two shifted curves 3 and 4 (at a voltage shift of ΔV) resulting from the increase and reduction of the writing pulses.

DESCRIPTION OF THE PREFERRED EMBODIMENTS

As previously described, at least one double chiral nematic liquid crystal compound selected from the group consisting of the liquid crystal compounds of the above-described formulae (I), (II), and (III) is used as a cholesteric phase liquid crystal to give a helical structure to the STN mode liquid crystal material. An amount of the double chiral nematic liquid crystal compound to be used is determined depending upon a desired helical pitch, and is generally within a range of about 0.4 to 8% by weight with regard to the total weight of the nematic liquid crystals. The most preferred amount will be selected from the above range, taking a helical pitch inherent to the used double chiral nematic liquid crystal compound into consideration.

Generally, and as described above, the double chiral nematic liquid crystal compound as the cholesteric phase liquid crystal is added in a minor amount. Namely, it was considered that the cholesteric phase liquid crystal does not directly concern the polarity reverse electric current, but an addition thereof can modify a compatibility of the nematic liquid crystals, thereby preventing from causing an adsorption of a certain nematic liquid crystal, especially a liquid crystal having a large dielectric anisotropy, onto an orientation layer, and the polarity reverse transient electric current is decreased accordingly.

Therefore, to find a cholesteric phase liquid crystal capable of inducing a helical structure without an adverse effect on the nematic liquid crystals, the inventors studied a variety of liquid crystal compounds and concluded that double chiral nematic liquid crystal compounds which have basically the same structure as that of the nematic liquid crystals and contain a chiral center on each end portion of the compounds, especially those represented by the above-described formulae (I), (II) and (III), are effective as the cholesteric phase liquid crystal of the present invention.

The mixed nematic liquid crystals to which the cholesteric phase liquid crystal of the formula (I), (II) or (III) is added to form the STN mode liquid crystal material of the present invention can be widely selected from well-known nematic liquid crystals conventionally used in the field of the liquid crystal technology. Typical examples of useful nematic liquid crystals include:

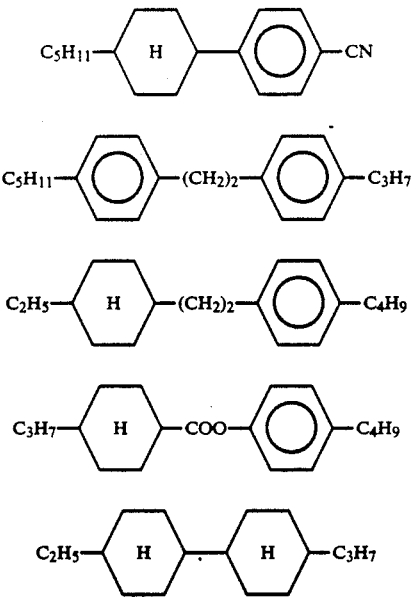

An improved STN mode display device can be constituted by using the liquid crystal material of the present invention as a layer of the liquid crystal material. Preferably, the display device has a simple matrix structure, especially an X- and Y-stripe electrode structure, and is driven at a duty ratio of 1/200 or less, more preferably 1/300 to 1/400. The display device enables the assembly of a high information content of 640×400 dots or more without crosstalk among the display images. In addition, it is possible to provide an unexpectedly improved clear display, together with a good display with a grayscale capability.

Figure 5:
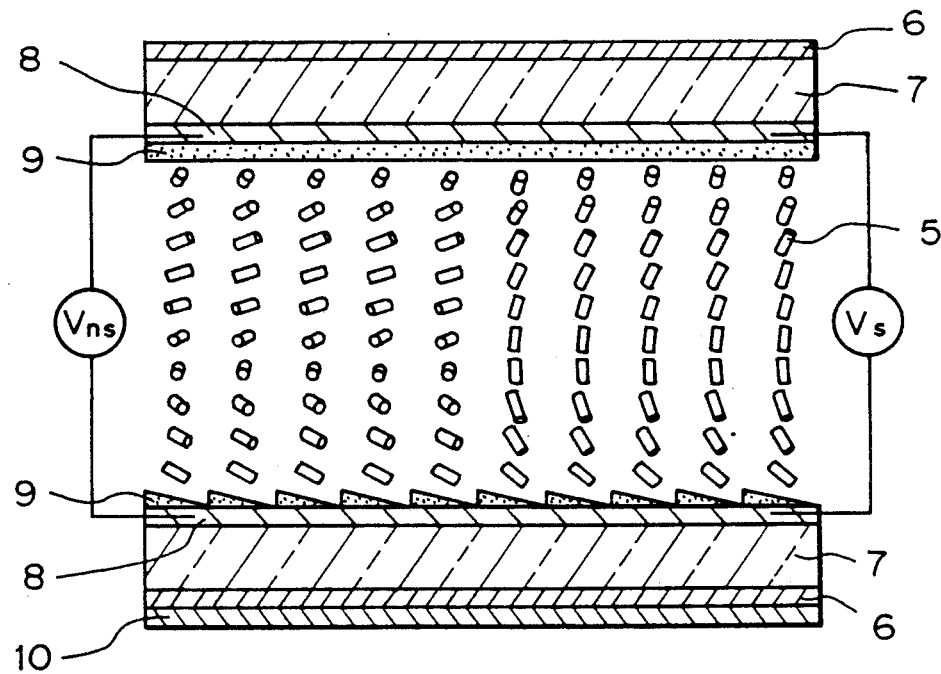
FIG. 5 is a cross-sectional view showing a preferred embodiment of the liquid crystal display device according to the present invention; and, FIG. 6 is a plan view showing an arrangement of the X- and Y-stripe electrodes of the display device of FIG. 5.

FIG. 5 diagrammatically shows a preferred embodiment of the STN mode liquid crystal display device according to the present invention. As illustrated, a layer of the STN mode liquid crystal material, or double chiral nematic liquid crystal-incorporated, mixed nematic liquid crystal, according to the present invention is sandwiched between a pair of transparent electrodes or conducting coatings 8. The liquid crystal layer contains liquid crystal molecules 5 and has a layer thickness of about 6 to 7 $\mu$m. The transparent electrode 8 is deposited on a surface of the glass substrate 7, and an orientation layer 9 such as SiO oblique deposition layer or rubbing layer of alkylamine-incorporated polyimide is further deposited on a surface of the transparent electrode 8. Further, the glass substrate 7 has a polarizing film 6 on an opposite surface thereof to the electrode 8. Furthermore, one of the glass substrates 7 has a reflection plate 10 on the polarizing film 6. With the layer thickness of the liquid crystal or panel gap of about 6 to 7 $\mu$m, the selective voltage (higher voltage) $V_s$ is about 23 volts at a duty ratio of 1/200, and the non-selective voltage (lower voltage $V_{ns}$ is about 22 volts at the same duty ratio.

In the illustrated display device, assuming that a twisting angle of the liquid crystal in the panel is 270°, an amount of the double chiral nematic liquid crystal incorporated is determined so that the resulting liquid crystal material in a bulk state shows a helical pitch of about 8 to 9.3 $\mu$m. A measure of the helical pitch not taking into account of a pretilt effect is calculated from the following equation:

$$\text{helical pitch } (\mu m) = (6-7) \times \frac{360°}{270°} = 8-9.3$$

Note, generally, the twisting angle calculated not taking into account the pre-tilt, is smaller than the actual twisting angle.

Figure 6:
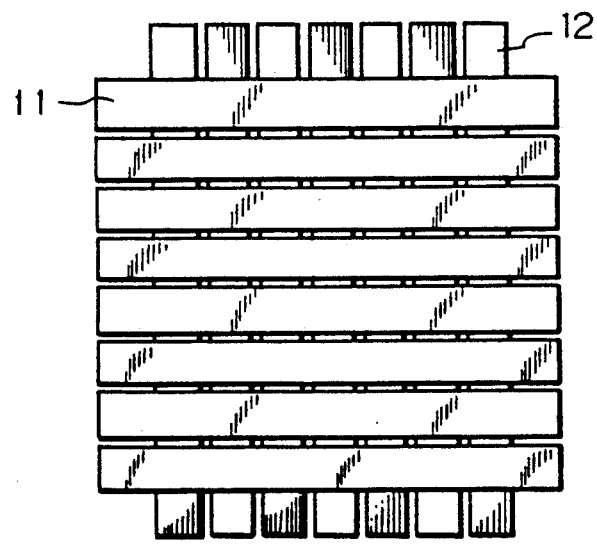

The transparent electrodes used in the present invention have a matrix structure of X- and Y-stripe electrodes as shown in FIG. 6. The X stripe electrodes 11 are disposed so as to cross the Y stripe electrodes 12, and a layer of the liquid crystal material (not shown) is sandwiched between these electrodes. Images or patterns are displayed at each cross point of the electrodes 11 and 12.

The present invention will be further described with regard to working examples thereof, but it should be noted that these examples do not restrict the present invention.

EXAMPLE

An STN mode liquid crystal material of the present invention was prepared by mixing a cyanobiphenyl liquid crystal, cyanophenyl cyclohexane liquid crystal, transcyclohexane liquid crystal, and ester type liquid crystal at a predetermined mixing ratio to obtain a mixed nematic liquid crystal. A double chiral nematic liquid crystal of Table 1, as a cholesteric phase liquid crystal, was added to the mixed nematic liquid crystal, and an amount of the cholesteric phase LC was adjusted to obtain a liquid crystal material having a helical pitch of 10.5 μm, in all examples.

For comparison, the above procedure was repeated with the proviso that the cholesteric phase LC of Table 1 was replaced by the cholesteric phase LC of Table 2, i.e., a conventional chiral nematic LC.

After the preparation of the liquid crystal material, a liquid crystal panel was produced by using a dot matrix panel of 200×200 dots and an orientation layer consisting of a polyimide rubbing layer. The liquid crystal panel had a panel gap of 6.5 μm and a twist angle of 260°.

Figure 1:
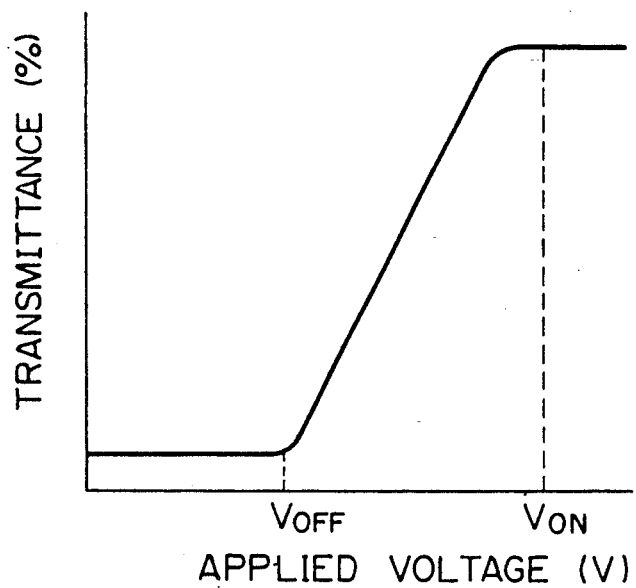
FIG. 1 is a graph showing a relationship between the applied voltage and the transmittance in the prior art TN mode liquid crystal material.
Figure 2:
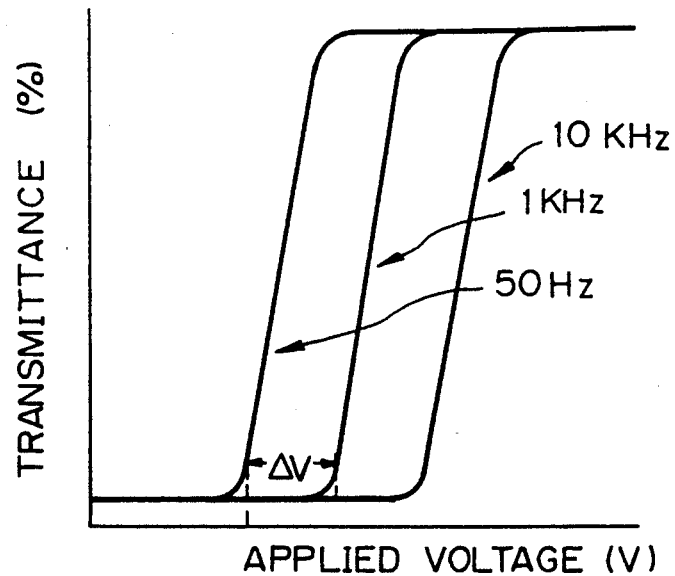
FIG. 2 is a graph showing a relationship between the applied voltage and the transmittance in the prior art STN mode liquid crystal material.
Figure 3A:
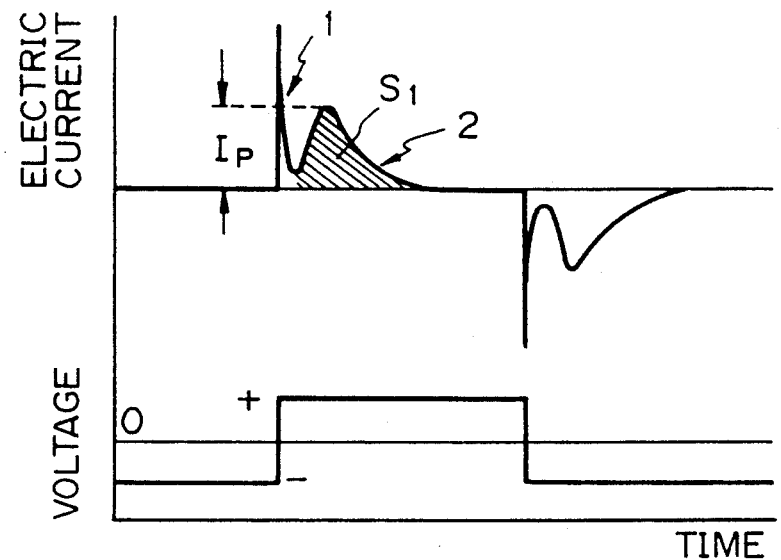
FIGS. 3(A) to 3(C) show diagramatically the crosstalk and a mechanism thereof in the prior art STN mode liquid crystal material.
Figure 3B:
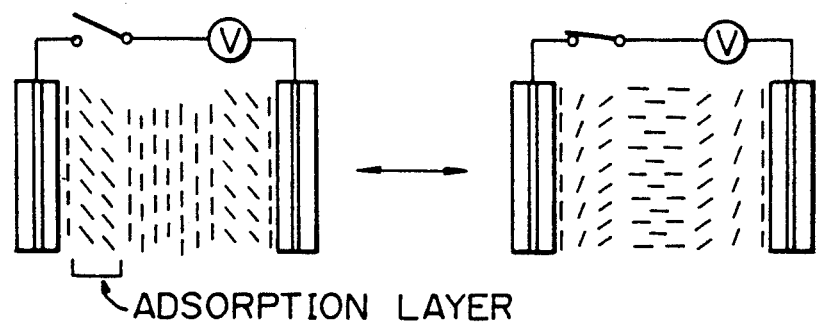
Figure 3C:
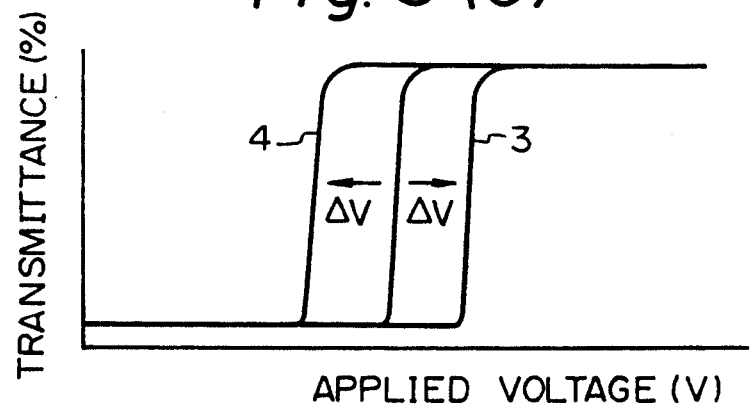
Figure 4A:
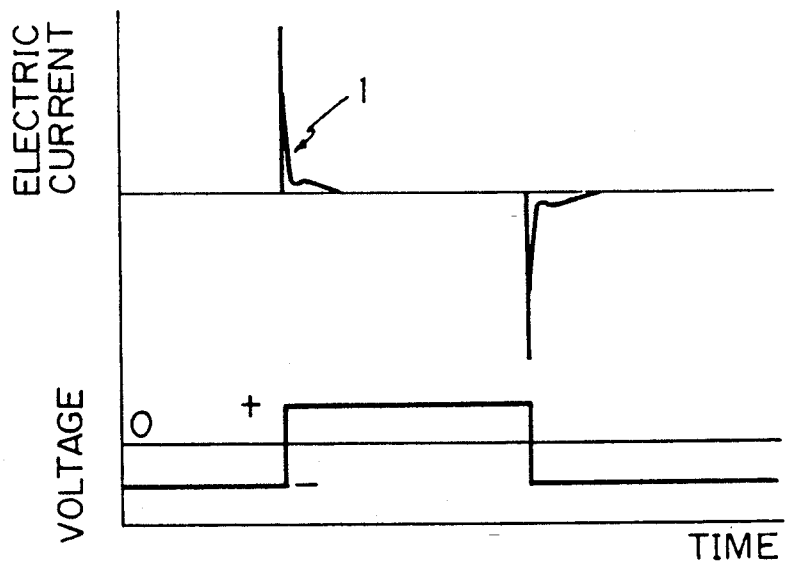
FIGS. 4(A) to 4(C) show diagramatically the prevention of the crosstalk and a mechanism thereof in the STN mode liquid crystal material of the present invention.
Figure 4B:
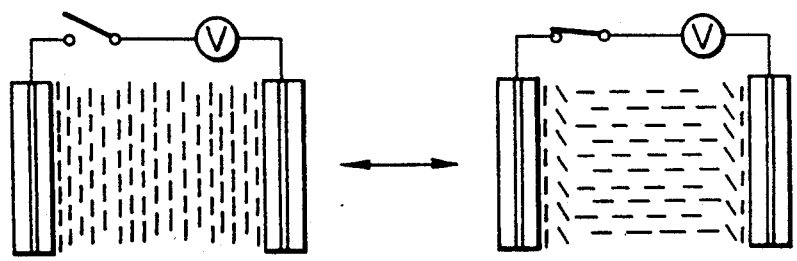
Figure 4C:
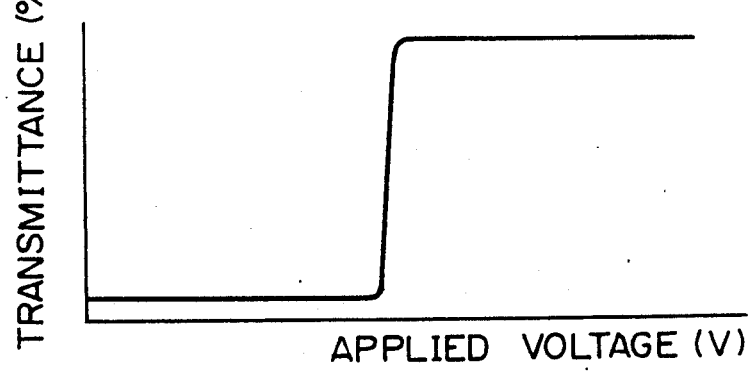

Using the liquid crystal panel, a polarity reverse peak electric current $I_p$, and an electric charge $S_1$ of the reverse polarity, see FIG. 3(A), and a difference $\Delta V$ of the kick-off voltage in the curve of the applied voltage vs. transmittance at the frequency of 1 kHz and 50 Hz, see FIG. 2, were measured. The results of these measurements are summarized in the following Tables 1 and 2. Note, Table 2 shows the results of the comparative examples.

TABLE 1

| Cholesteric phase LC | $I_p$ (μA/cm$^2$) | $S_1$ (nC/cm$^2$) | $\Delta V$ (V) |
|---|---|---|---|
| $C_6H_{13}$CH*(S)(CH$_3$)O—⟨⟩—⟨⟩—C(=O)O—CH*(S)(CH$_3$)C$_2$H$_5$ | 1.3 | 8.9 | 0.04 |
| $C_6H_{13}$CH*(R)(CH$_3$)O—⟨⟩—⟨⟩—C(=O)O—CH*(S)(CH$_3$)C$_2$H$_5$ | 1.3 | 7.5 | 0.03 |
| $C_6H_{13}$CH*(R)(CH$_3$)O—⟨⟩—⟨⟩—C(=O)O—CH*(R)(CH$_3$)C$_2$H$_5$ | 1.3 | 7.1 | 0.03 |
| $C_6H_{13}$CH*(S)(CH$_3$)O—⟨⟩—⟨⟩—C(=O)O—CH*(R)(CH$_3$)C$_2$H$_5$ | 1.4 | 7.7 | 0.04 |
| $C_2H_5$CH*(S)(CH$_3$)O—⟨⟩—⟨⟩—C(=O)O—CH*(S)(CH$_3$)C$_5$H$_{11}$ | 1.5 | 8.8 | 0.06 |
| $C_3H_5$CH*(S)(CH$_3$)O—⟨⟩—⟨⟩—C(=O)O—CH*(S)(CH$_3$)C$_7$H$_{15}$ | 1.7 | 8.9 | 0.05 |
| $C_4H_9$CH*(R)(CH$_3$)O—⟨⟩—⟨⟩—C(=O)O—CH*(S)(CH$_3$)C$_6$H$_{13}$ | 0.9 | 7.1 | 0.06 |
| $C_2H_5$CH*(S)(CH$_3$)O—⟨⟩—⟨⟩—C(=O)O—CH*(S)(CH$_3$)C$_{12}$H$_{25}$ | 1.5 | 12.1 | 0.05 |
| $C_6H_{13}$CH*(S)(CH$_3$)O—⟨⟩—⟨⟩—C(=O)O—CH*(S)(OC$_2$H$_5$)C$_6$H$_{13}$ | 1.3 | 8.9 | 0.05 |
| $C_6H_{13}$CH*(S)(CH$_3$)O—⟨⟩—⟨⟩—C(=O)O—CH*(S)(CH$_3$)—⟨⟩—C$_3$H$_7$ | 0.9 | 7.5 | 0.04 |

TABLE 1-continued

| Cholesteric phase LC | $I_p$ (μA/cm$^2$) | $S_1$ (nC/cm$^2$) | ΔV (V) |
|---|---|---|---|
| $C_6H_{13}\overset{*(S)}{C}HO$—⟨⟩—⟨⟩—$\overset{O}{\underset{\|}{C}}$—O—$\overset{*(S)}{\underset{CH_3}{CH}}$—⟨⟩—$OC_2H_5$ (with CH$_3$ branch on first C) | 0.8 | 7.9 | 0.04 |

$I_p$: reverse polarity peak electric current
$S_1$: electric charge at reverse polarity
ΔV: difference of kick-off voltage in curve of applied electrode vs. transmittance at frequency of 1 kHz and 50 Hz

TABLE 2

| Cholesteric phase LC | $I_p$ (μA/cm$^2$) | $S_1$ (nC/cm$^2$) | ΔV (V) |
|---|---|---|---|
| $C_2H_5\overset{*}{C}H$—$CH_2$—⟨⟩—⟨⟩—CN (CH$_3$ branch) | 18.7 | 35.5 | 0.12 |
| $C_2H_5\overset{*}{C}HCH_2O$—⟨⟩—⟨⟩—CN (CH$_3$ branch) | 16.5 | 36.4 | 0.12 |
| $C_5H_{11}O$—⟨⟩—C(=O)—O—⟨⟩—$CH_2\overset{*}{C}HC_6H_{13}$ (CH$_3$ branch) | 14.2 | 32.1 | 0.09 |
| $C_6H_{13}\overset{*}{C}H$—C(=O)—O—⟨⟩—O—C(=O)—⟨⟩—$OC_6H_{13}$ (CH$_3$ branch) | 9.5 | 28.5 | 0.08 |
| $C_2H_5$—$\overset{*}{C}H$—$CH_2O$—⟨⟩—C(=O)—O—⟨⟩—CN (CH$_3$ branch) | 14.8 | 32.2 | 0.10 |
| $CH_3(CH_2)_7C(=O)$—O—$C_{27}H_{45}$ | 19.5 | 38.8 | 0.15 |

$I_p$, $S_1$ and ΔV: see Table 1.

The results of Tables 1 and 2 show that, if the liquid crystal panel has small $I_p$ and $S_1$ values, it will exhibit a reduced voltage shift or ΔV, and that the liquid crystal panels of the present invention can provide satisfactory results, i.e., reduced $I_p$ and $S_1$, in comparison with the panels of the comparative examples.

We claim:

1. A liquid crystal material for use in a super twisted nematic mode display, in which a cholesteric phase liquid crystal is added to a mixture of nematic liquid crystals to induce a spiral structure therein, and the cholesteric phase liquid crystal is at least one double chiral nematic liquid crystal compound of the following general formula:

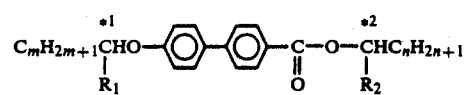

(I)

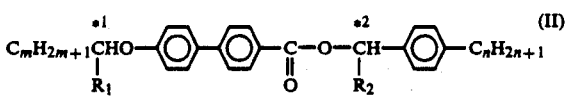

(II)

or

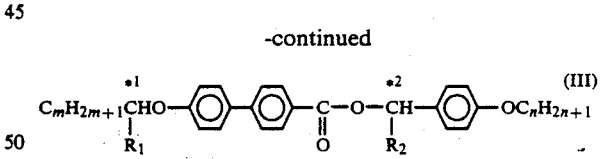

(III)

in which
R$_1$ and R$_2$ may be the same or different and each represents a methyl group or an ethoxy group,
m is an integer of 2 to 12,
n is an integer of 2 to 12, and
the symbols *$^1$ and *$^2$ each denote a chiral center of an (S)- or (R)-modification of the compound.

2. A liquid crystal material according to claim 1, in which the super twisted nematic mode display has a simple matrix structure and is driven at a duty ratio of 1/200 or less.

3. A liquid crystal material according to claim 1, in which the double chiral nematic liquid crystal compound is present in an amount of 0.4 to 8% by weight with regard to the total weight of the nematic liquid crystals.

4. A liquid crystal material according to claim 1, wherein the liquid crystal material has a helical pitch of about 8 to 9.3 μm in a bulk state.

5. A liquid crystal material according to claim 1, wherein the mixture of nematic liquid crystals includes cyanobiphenyl liquid crystal, cyanophenyl cyclohexane liquid crystal, transcyclohexane liquid crystal, and ester type liquid crystal.

6. A liquid crystal display device of a super twisted nematic mode display system, which comprises a layer of liquid crystal material, in which a cholesteric phase liquid crystal is added to a mixture of nematic liquid crystals to induce a spiral structure therein, and the cholesteric phase liquid crystal is at least one double chiral nematic liquid crystal compound of the following general formula:

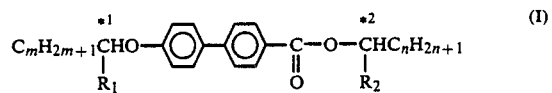  (I)

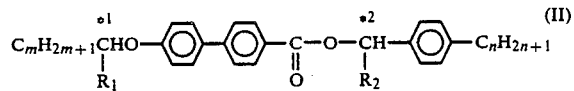  (II)

or

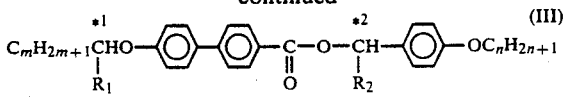  (III)

in which
R$_1$ and R$_2$ may be the same or different and each represents a methyl group or an ethoxy group,
m is an integer of 2 to 12,
n is an integer of 2 to 12, and
the symbols *1 and *2 each denote a chiral center of an (S)- or (R)-modification of the compound, and a means for applying a voltage across the liquid crystal material layer to form a liquid crystal image therein.

7. A display device according to claim 6, which has a simple matrix structure and is driven at a duty ratio of 1/200 or less.

8. A display device according to claim 6, in which the double chiral nematic liquid crystal compound is present in an amount of 0.4 to 8% by weight with regard to the total weight of the nematic liquid crystals.

9. A display device according to claim 6, which has an information content of 640×400 dots or more.

10. A display device according to claim 6, wherein the liquid crystal material layer has a thickness of about 6 to 7 μm.

11. A display device according to claim 10, wherein the liquid crystal material has a helical pitch in a bulk state that is larger than the thickness of the liquid crystal material layer.

* * * * *